US011738861B2

(12) United States Patent
Hesse

(10) Patent No.: US 11,738,861 B2
(45) Date of Patent: Aug. 29, 2023

(54) PROPELLING SYSTEM WITH VARIABLE AERODYNAMIC CONTROLS

(71) Applicant: Thomas Norman Hesse, Harrison Hot Springs (CA)

(72) Inventor: Thomas Norman Hesse, Harrison Hot Springs (CA)

( * ) Notice: Subject to any disclaimer, the term of this patent is extended or adjusted under 35 U.S.C. 154(b) by 776 days.

(21) Appl. No.: 16/449,173

(22) Filed: Jun. 21, 2019

(65) Prior Publication Data

US 2020/0023952 A1   Jan. 23, 2020

Related U.S. Application Data

(60) Provisional application No. 62/766,596, filed on Jun. 21, 2018.

(51) Int. Cl.
*B64C 27/68* (2006.01)
*B64C 9/00* (2006.01)
*B64C 27/72* (2006.01)

(52) U.S. Cl.
CPC ............. *B64C 27/68* (2013.01); *B64C 9/00* (2013.01); *B64C 27/72* (2013.01); *B64C 2009/005* (2013.01); *Y02T 50/30* (2013.01)

(58) Field of Classification Search
CPC ............ B64C 27/72; B64C 2027/7266; B64C 2009/005; B64C 27/68; B64C 2027/7261; B64C 2027/7272; B64C 2027/7277; B64C 2027/7283; B64C 2027/7288; B64C 2027/7294
See application file for complete search history.

(56) References Cited

U.S. PATENT DOCUMENTS

| 2,716,460 A * | 8/1955 | Young .................. B64C 27/615 244/214 |
| 6,508,439 B1 * | 1/2003 | Fink ..................... B64C 27/615 244/215 |
| 10,017,278 B2 | 7/2018 | Hesse |
| 2010/0181415 A1 * | 7/2010 | Altmikus ............. B64C 27/473 244/17.11 |
| 2014/0169967 A1 * | 6/2014 | Wilkins ................ B64C 27/48 416/31 |

FOREIGN PATENT DOCUMENTS

DE        202004006333 U1 *  6/2004

OTHER PUBLICATIONS

English machine translation of DE-202004006333-U1, Dec. 1, 2022.*

* cited by examiner

*Primary Examiner* — Christopher Verdier

(57) ABSTRACT

A propelling system with variable aerodynamic controls is a system used to generate and control the flight forces of an aircraft. The system includes a stator, a rotor, a plurality of propelling units, and a control system. The stator serves as the stationary connection to the aircraft. The rotor revolves the propelling units about a central rotation axis. The control system enables the control of the propelling units. The propelling units generate the flight forces for the aircraft in the desired direction. In addition, each of the propelling units include a blade body, a shaft channel, a spar shaft, and at least one aileron assembly. The shaft channel receives the spar shaft within the blade body. The spar shaft connects the blade body to the rotor. The blade body passively corrects its angle of attack and supports the aileron assembly. The aileron assembly adjusts the pitch of the blade body.

17 Claims, 15 Drawing Sheets

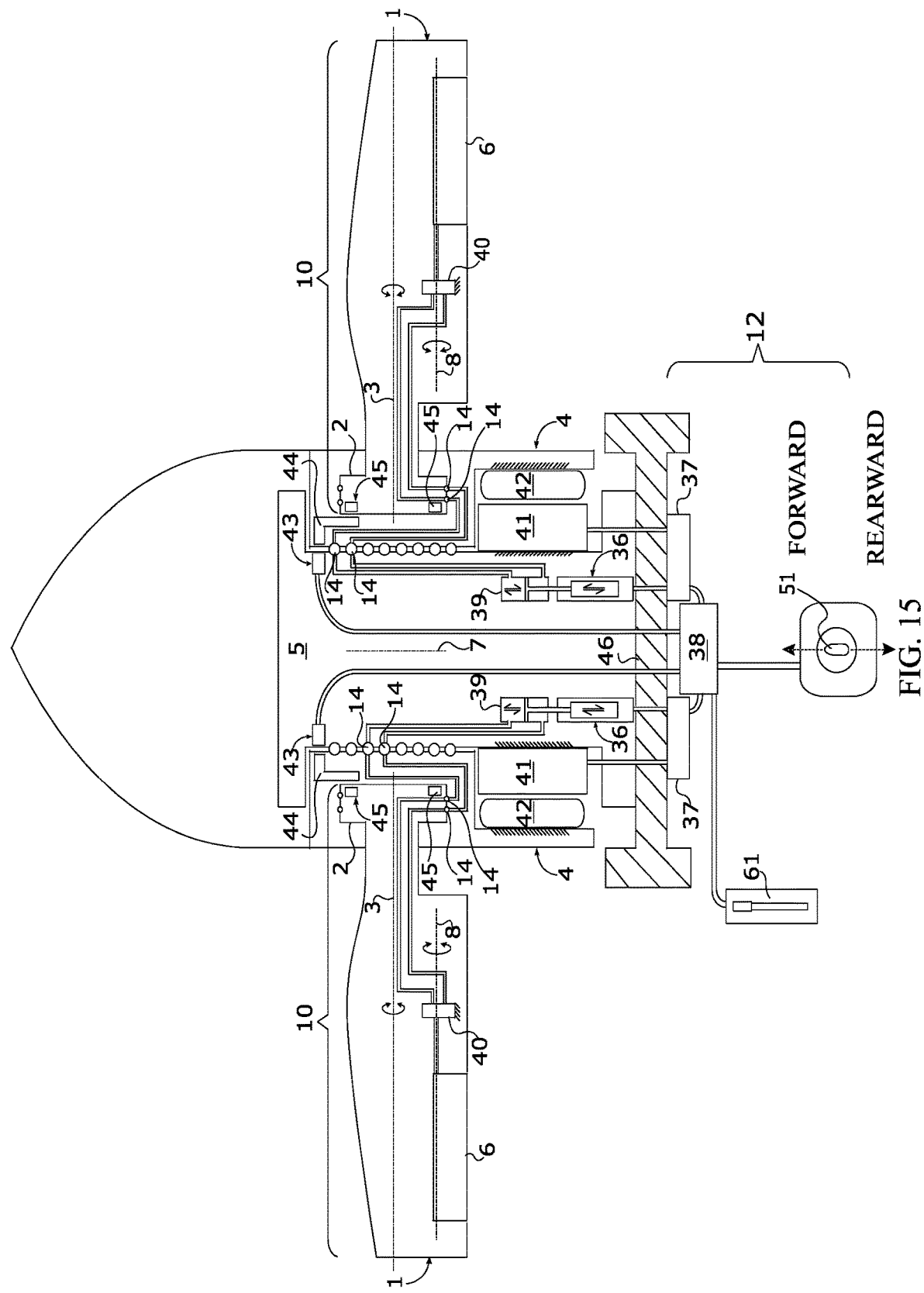

PROPELLING SYSTEM WITH VARIABLE AERODYNAMIC CONTROLS

The current application claims a priority to a U.S. non-provisional application Ser. No. 16/015,125 filed on Jun. 21, 2018. The U.S. non-provisional application Ser. No. 16/015,125 was converted into a U.S. provisional application Ser. No. 62/766,596 on Feb. 5, 2018.

FIELD OF THE INVENTION

The present invention relates generally to rotary-wing aircraft or tilt-wing aircraft. More specifically, the present invention relates to a propelling system with variable aerodynamic controls which enables control of individual propelling units through 360 degrees of pitch.

BACKGROUND OF THE INVENTION

Rotary wing aircraft generally use rotor blade control mechanisms that are highly complex and rely on mechanical parts which need regular maintenance in order to avoid failure. Traditional rotor blades, while being rotatably mounted, are also tied to the rotor by a mechanism that is used to physically alter the pitch of the rotor blade over a limited range. A design which can reduce the complexity of the rotor blade pitch control mechanism while at the same time allowing the pitch of the rotor blade to be actuated over a greater range is necessary.

An objective of the present invention is to provide a propelling system with variable aerodynamic controls which increases lifting efficiency at very high altitudes and reduces the number, weight, and complexity of the pitch actuating components, thereby enabling higher rotor Revolutions Per Minute (RPM) which generates greater lift. Another objective of the present invention is to provide a propelling system with variable aerodynamic controls which enables the lift or thrust direction to be reversed simply by changing the rotational direction of the rotor, whereby a plurality of propelling units naturally rotates on a pitch axis to meet the oncoming airflow from the new rotational direction to provide lift or thrust in the opposite direction. Furthermore, another objective of the present invention is to provide a propelling system with variable aerodynamic controls which enables a plurality of propelling units to passively provide lift which is relative to either the driven RPM of the rotor or the speed of the oncoming airflow whenever the plurality of propelling units is not being actively controlled.

SUMMARY OF THE INVENTION

The present invention is a propelling system with variable aerodynamic controls. The present invention enables the control of the pitch of a plurality of propelling units through 360 degrees around a pitch axis. Each of the plurality of propelling units operates efficiently while rotating in either direction around a rotor, thereby enabling a change in lift or thrust direction without a loss of efficiency. Further, the propelling system with variable aerodynamic controls is not mechanically connected to the rotor. Instead, each of the plurality of propelling units is free to fly into the oncoming airflow through 360 degrees of pitch, thus naturally generating the optimum amount of lift for any rotational speed.

BRIEF DESCRIPTION OF THE DRAWINGS

FIG. 15 is a schematic view of the second alternate embodiment of the present invention, wherein the present invention is configured with an electronically timed linear actuation system for forward/rearward directional control.

DETAIL DESCRIPTIONS OF THE INVENTION

All illustrations of the drawings are for the purpose of describing selected versions of the present invention and are not intended to limit the scope of the present invention.

Figure 1:
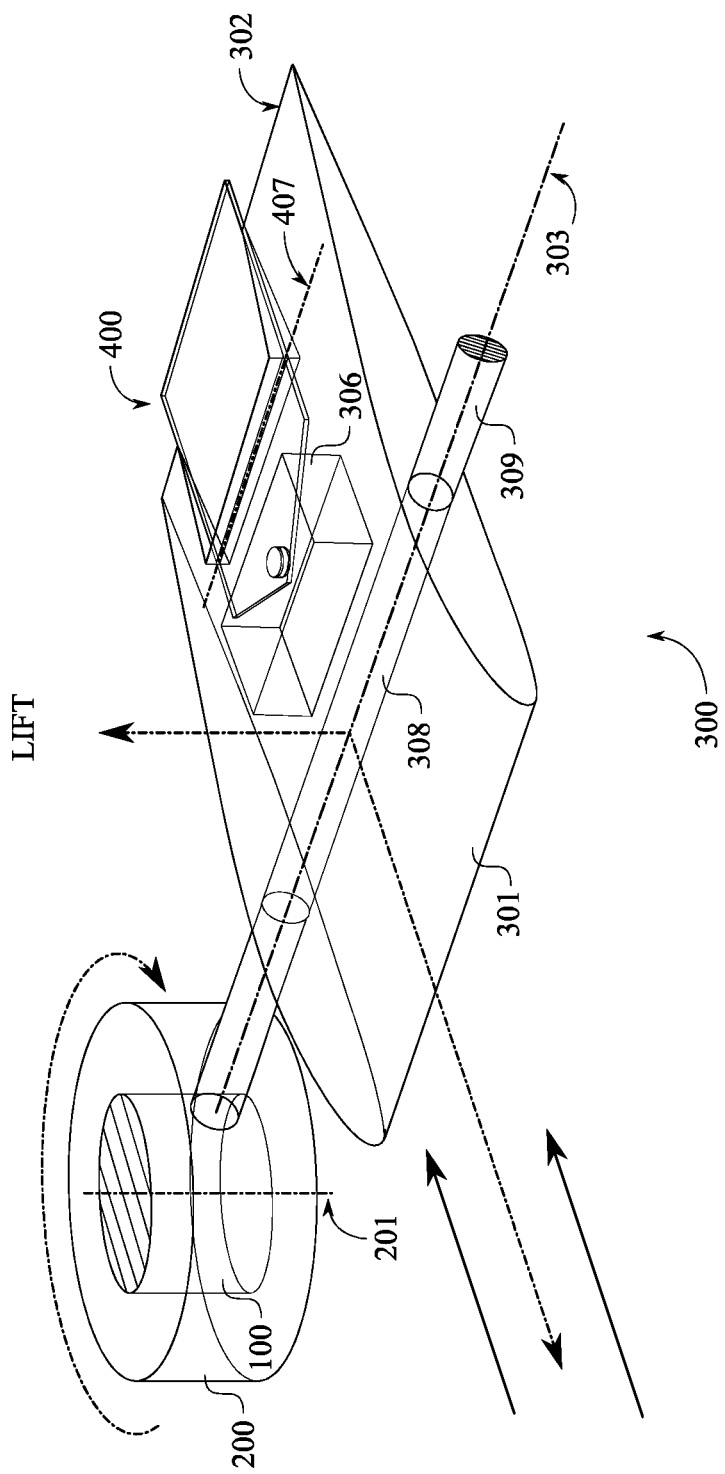
FIG. 1 is a schematic view of the plurality of propelling units, the rotor, and the stator, wherein the airflow is shown in arrows oriented in opposite direction to the clockwise revolving of the plurality of propelling units around the stator.
Figure 2:
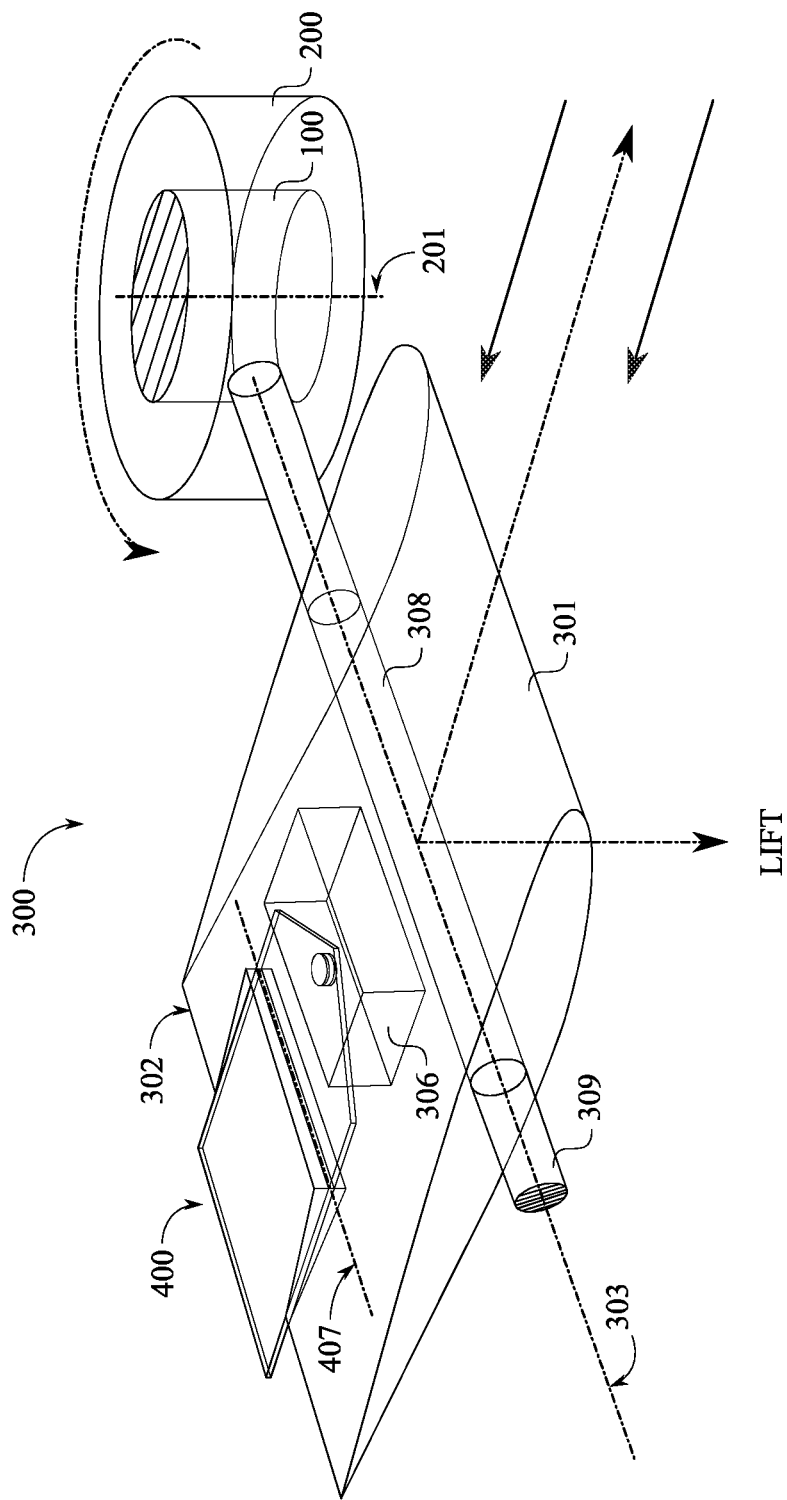
FIG. 2 is a schematic view of the plurality of propelling units, wherein the plurality of propelling units is being revolved in a counterclockwise direction around the stator.

The present invention is a propelling system with variable aerodynamic controls which can be used on an aircraft or as the wind turbine for an electricity generator. In a preferred embodiment, the present invention comprises a stator 100, a rotor 200, a plurality of propelling units 300, and a control system 500. The stator 100 serves as the stationary connection to the aircraft or generator housing. As can be seen in FIGS. 1 and 2, the rotor 200 revolves the plurality of propelling units 300 about a central rotation axis 201. The control system 500 enables the manual or automatic control of the plurality of propelling units 300. The plurality of propelling units 300 serves to generate flight forces in a desired direction. In addition, each of the plurality of propelling units 300 comprises a blade body 301, a shaft channel 308, a spar shaft 309, and at least one aileron assembly 400. The blade body 301 comprises a trailing edge 302. The shaft channel 308 receives the spar shaft 309 within the blade body 301. The spar shaft 309 connects the blade body 301 to the rotor 200. The blade body 301 supports the at least one aileron assembly 400. The at least one aileron assembly 400 is used to adjust the pitch of the blade body 301.

Figure 10:
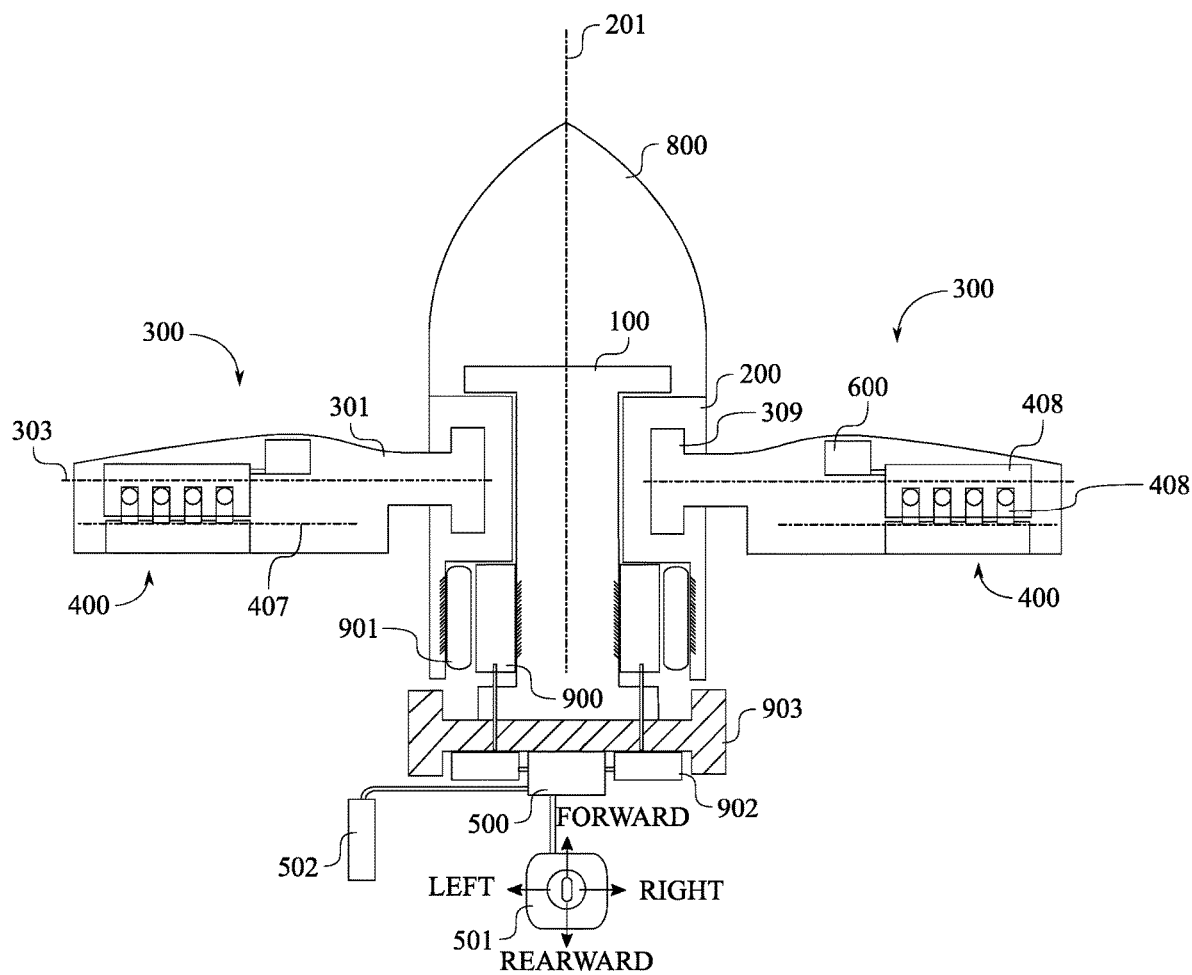
FIG. 10 is a schematic view of the control system, wherein a plurality of electric motor windings and a plurality of motor magnets are integrated on the stator and the rotor, respectively.

The general configuration of the aforementioned components enables the present invention to generate controlled flight forces for an aircraft in a desired direction. As can be seen in FIGS. 1-2 and 10, the stator 100 is preferably fixed to the firewall 903 of a Vertical Takeoff or Landing (VTOL) aircraft to orient the plurality of propelling units 300 relative to the orientation of the aircraft. The rotor 200 is rotatably mounted to the stator 100 to freely rotate about the cylindrical axis of the stator 100. The plurality of propelling units 300 is radially positioned around the central rotation axis 201 of the rotor 200. The rotor 200 is terminally connected to the spar shaft 309 for each of the plurality of propelling units 300. The spar shaft 309 for each of the plurality of propelling units 300 is positioned perpendicular to the central rotation axis 201 of the rotor 200. Thus, the plurality of propelling units 300 freely travels around the stator 100 by the rotor 200. The shaft channel 308 traverses into the blade body 301 and is positioned perpendicular to the central rotation axis 201. The spar shaft 309 is positioned within the shaft channel 308. The blade body 301 is rotatably mounted about the spar shaft 309 to enable 360-degree movement of the blade body 301 about the spar shaft 309. In addition, the spar shaft 309 and the shaft channel 308 enable the blade body 301 to freely change pitch while being revolved around the stator 100 by the rotor 200. The at least one aileron assembly 400 is operatively integrated into the blade body 301, adjacent to the trailing edge 302, wherein the at least one aileron assembly 400 is used to adjust the pitch of the blade body 301. The control system 500 is electronically connected to the at least one aileron assembly 400 to monitor the pitch of the blade body 301 and to selectively change the pitch of the blade body 301 using the at least one aileron assembly 400. In some embodiments of the present invention, the spar shaft 309 is rotatably mounted onto the rotor 200 by one or more rotational joints.

Figure 3:
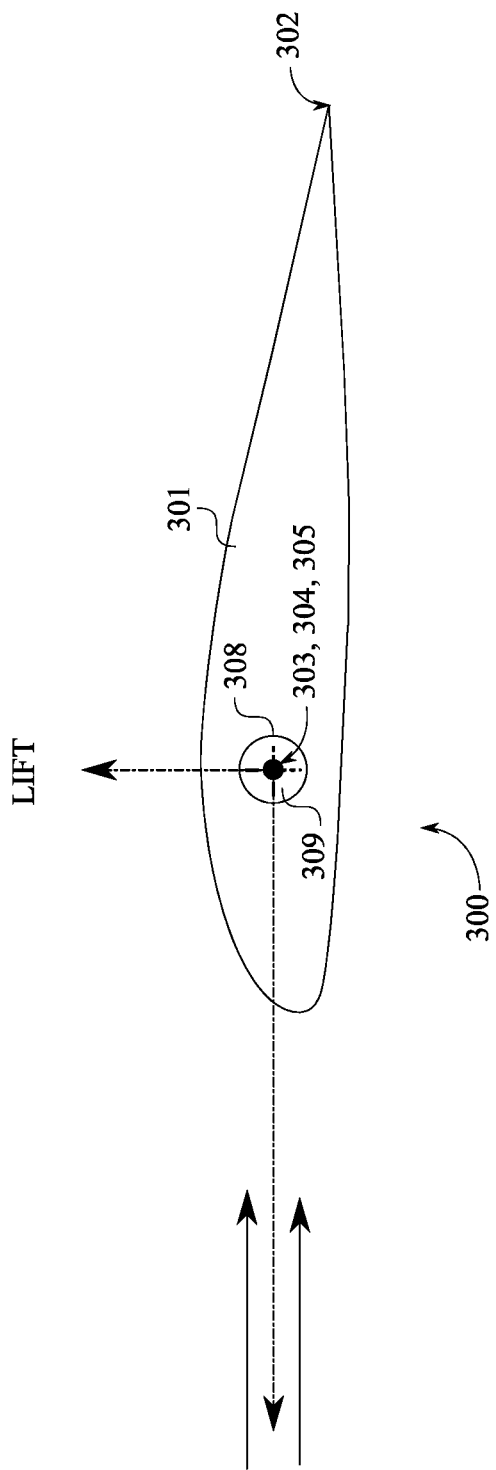
FIG. 3 is a schematic view of the blade body of the plurality of propelling units, wherein the pitch axis of the blade body is shown coincident to the center of lift and center of gravity of the blade body.
Figure 4:
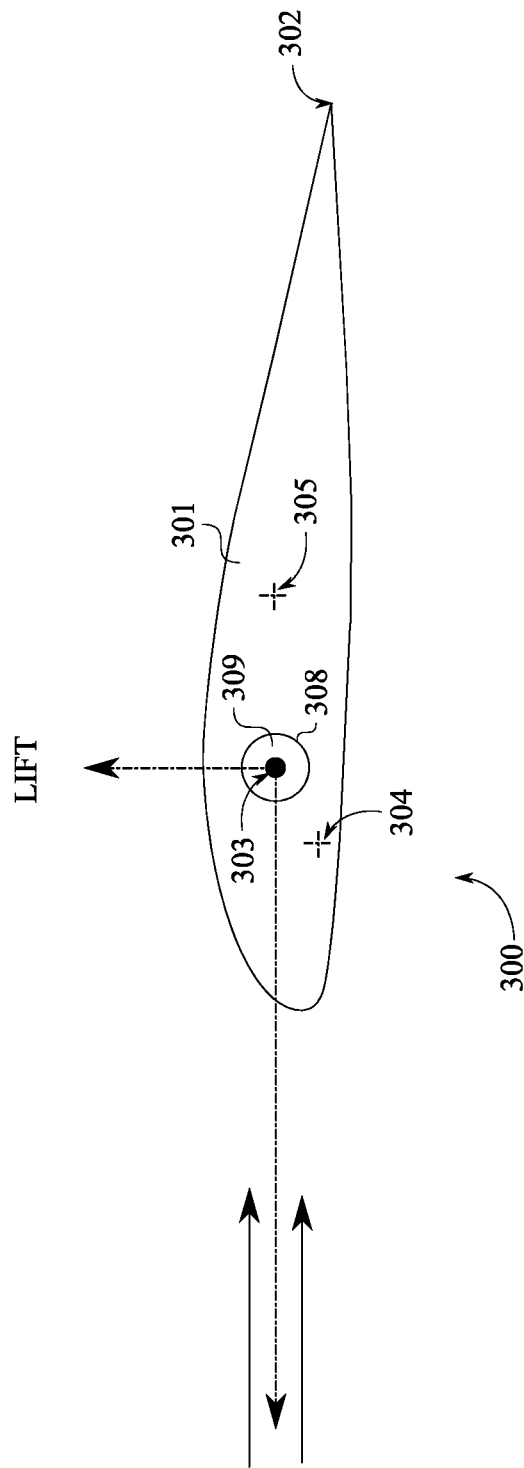
FIG. 4 is a schematic view of the blade body, wherein the pitch axis of the blade body is shown adjacent to the center of lift and center of gravity of the blade body.

Moreover, the general arrangement of the present invention allows the blade body 301 for each of the plurality of propelling units 300 to self-correct the Angle of Attack (AOA) in order to fly directly into the oncoming airflow. As can be seen in FIGS. 3 and 4, the blade body 301 is a flying wing-type airfoil. As can be seen in FIG. 3, the shaft channel 308 is axially positioned along a pitch axis 303 of the blade body 301. The pitch axis 303 of the blade body 301 is positioned coincident to the center of lift 304 of the blade body 301 and coincident to the center of gravity 305 of the blade body 301. Thus, the blade body 301 self-corrects the AOA in a passive manner to provide optimum lift. In addition, the faster that the blade body 301 flies into the oncoming airflow, the greater that the lift of the blade body 301 is generated in relation to the speed of the rotor 200. As can be seen in FIG. 1, when the rotor 200 rotates in a clockwise direction, the blade body 301 generates positive lift. As can be seen in FIG. 2, when the rotation of the rotor 200 is reversed, the blade body 301 naturally adjusts the AOA to fly into the oncoming airflow from the opposite direction, effectively reversing the direction of lift. In alternate embodiments of the present invention, the blade body 301 is a different type of airfoil. As can be seen in FIG. 4, the pitch axis 303 of the blade body 301 is positioned adjacent to the center of lift 304 of the blade body 301 and adjacent to the center of gravity 305 of the blade body 301. Thus, the blade body 301 can still self-correct the AOA in a passive manner to provide optimum lift with different airfoil types.

Figure 5:
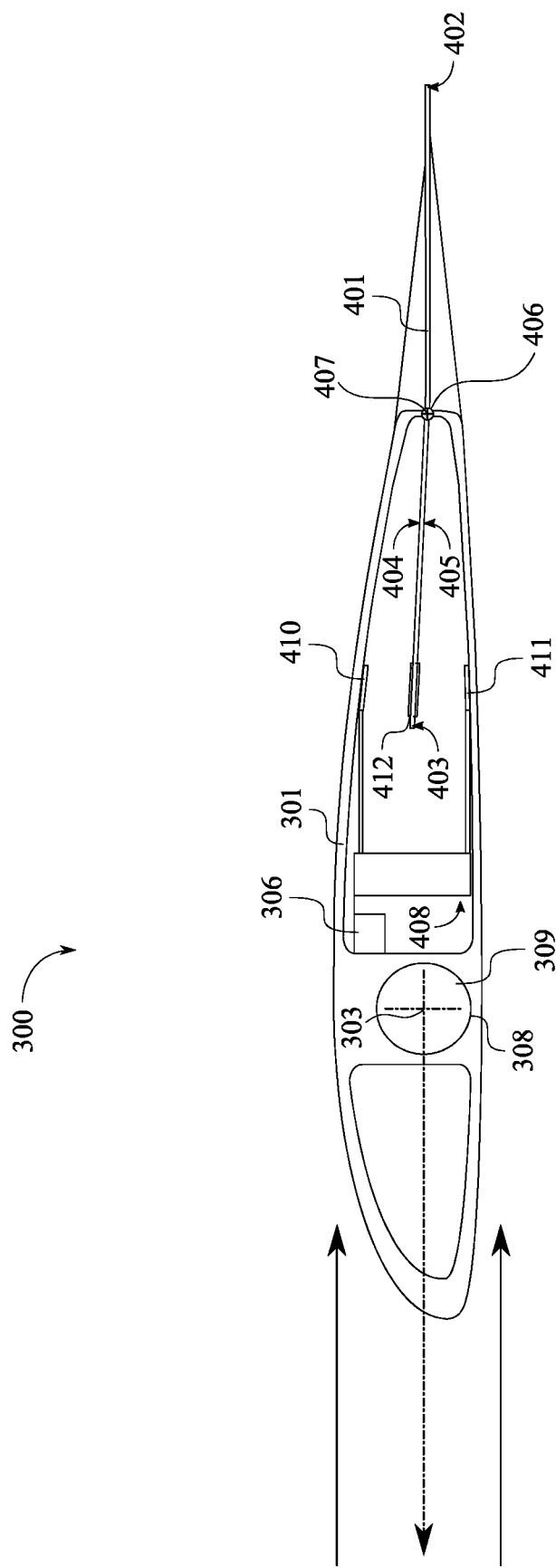
FIG. 5 is a schematic view of the blade body, wherein the at least one aileron assembly is shown pivotally connected to the blade body.
Figure 6:
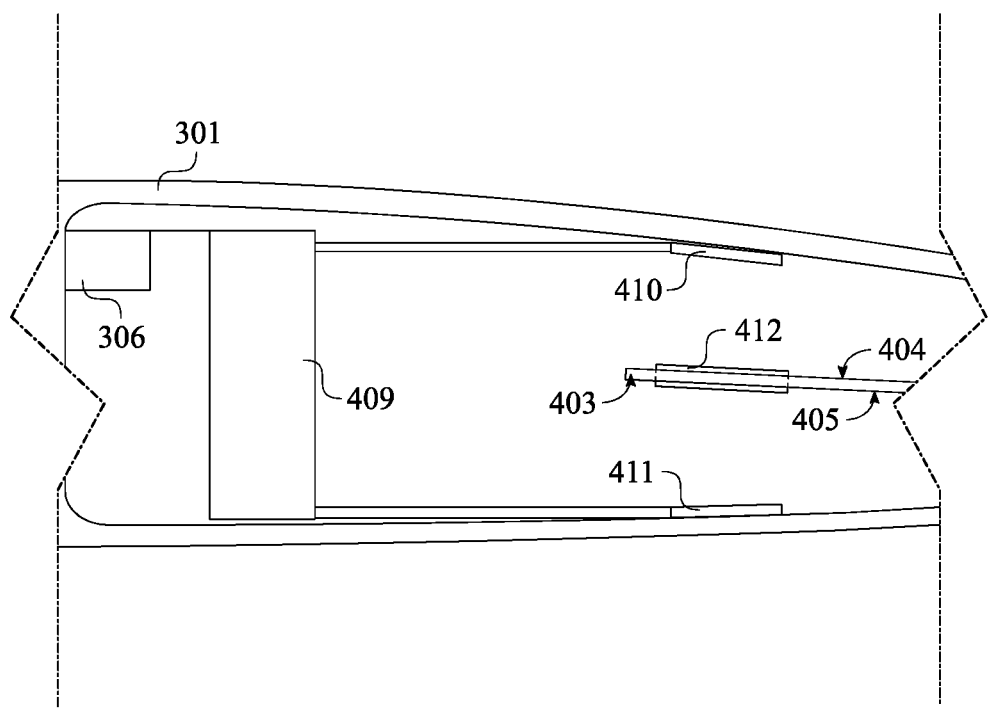
FIG. 6 is a schematic view of the at least one aileron assembly, wherein the aileron actuation mechanism is shown integrated into the blade body.

In addition to the self-correcting AOA capabilities of the blade body 301 for each of the plurality of propelling units 300, the at least one aileron assembly 400 for each of the plurality of propelling units 300 enables selective pitch adjustment of the corresponding blade body 301. As can be seen in FIGS. 5 and 6, the at least one aileron assembly 400 comprises an aileron body 401, an aileron fulcrum 406, and an aileron actuation mechanism 408. In addition, the aileron body 401 comprises an aileron proximal edge 403 and an aileron distal edge 402. The at least one aileron assembly 400 enables temporary increase or decrease of the blade body 301 AOA at specific locations as the blade body 301 travels around the stator 100. The aileron body 401 traverses into the blade body 301 from the trailing edge 302. The aileron body 401 is also hingedly mounted to the blade body 301 by the aileron fulcrum 406. A pivot axis 407 of the aileron fulcrum 406 is positioned parallel to the trailing edge 302. The aileron fulcrum 406 is positioned in between the aileron proximal edge 403 and the aileron distal edge 402. The aileron proximal edge 403 is positioned within the blade body 301. The aileron actuation mechanism 408 is operatively coupled to the aileron proximal edge 403, wherein the aileron actuation mechanism 408 is used to change a pitch of the aileron body 401. Thus, the aileron proximal edge 403 can be actuated by the aileron actuation mechanism 408 to pivot the aileron body 401 about the aileron fulcrum 406. Furthermore, each of the plurality of propelling units 300 further comprises a blade computing device 306 which is communicably coupled to the aileron actuation mechanism 408 and the control system 500 to remotely control the actuation of the aileron body 401. In some embodiments of the present invention, the at least one aileron assembly 400 comprises an Inertial Measurement Unit (IMU) 413 mounted within the blade computing device 306 and communicably coupled to the control system 500 to monitor the orientation of the blade body 301.

Figure 7:
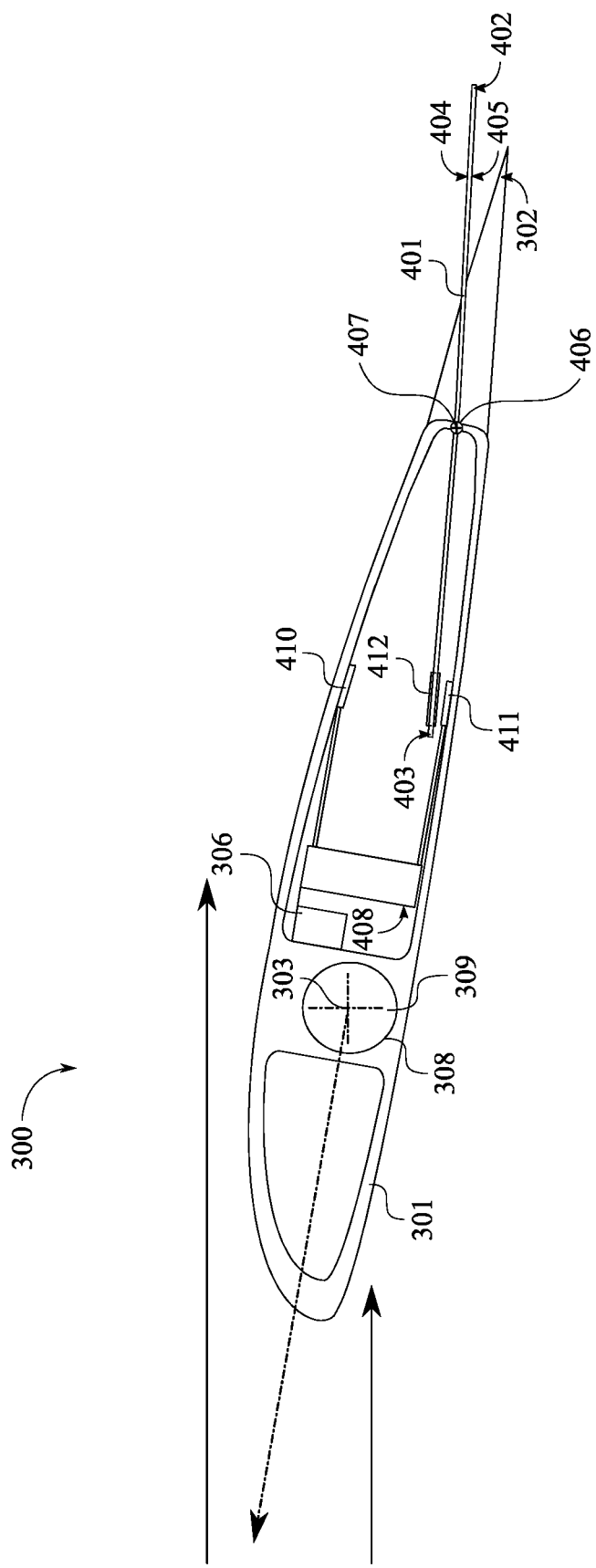
FIG. 7 is a schematic view of the blade body, wherein the aileron body is shown actuated upwards by the aileron actuation mechanism.
Figure 8:
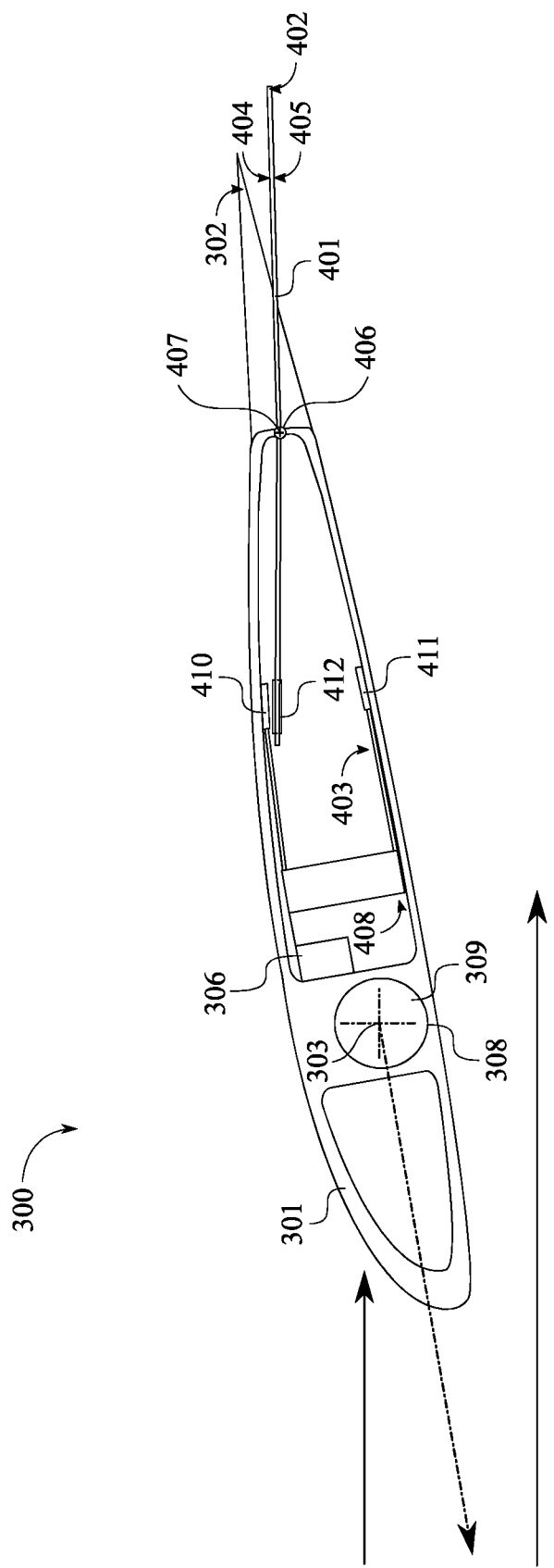
FIG. 8 is a schematic view of the blade body, wherein the aileron body is shown actuated downwards by the aileron actuation mechanism.

The aileron actuation mechanism 408 enables the aileron body 401 to be oriented at various pitches according to the required operation of the blade body 301. As can be seen in FIG. 5, in a first configuration, the aileron body 401 is in a neutral position where the blade body 301 responds passively to the oncoming airflow without the use of the at least one aileron assembly 400. In the neutral position, the blade body 301 can rotate freely around the pitch axis 303. As can be seen in FIG. 7, in a second configuration, the aileron body 401 deflects upwards into the airflow by lowering the aileron proximal edge 403. The airflow then acts on the aileron body 401 to force the trailing edge 302 downwards in relation to the spar shaft 309, thereby increasing the AOA of the blade body 301 relative to the oncoming airflow and increasing the lift felt by the spar shaft 309. As can be seen in FIG. 8, in a third configuration, the aileron body 401 deflects downward into the airflow by raising the aileron proximal edge 403. The airflow then acts on the aileron body 401 to force the trailing edge 302 upward in relation to the spar shaft 309, thereby decreasing the AOA of the blade body 301 relative to the oncoming airflow and decreasing the lift felt by the spar shaft 309. The ability of controlling the upward or downward pressure on the spar shaft 309 at specific locations as the spar shaft 309 travels around the stator 100 enables the plurality of propelling units 300 to control both the cyclic and collective pitch in a similar manner to conventional rotary wing aircraft. The present invention enables the possibility of a large plurality of propelling units 300 which may include any combination of passive and active plurality of propelling units 300, whereby passive plurality of propelling units 300 do not comprise at least one aileron assembly 400 and active plurality of propelling units 300 comprise at least one aileron assembly 400. In alternate embodiments, the present invention comprises a plurality of independently powered counter-rotating rotors which operate on the same stator 100.

Figure 9:
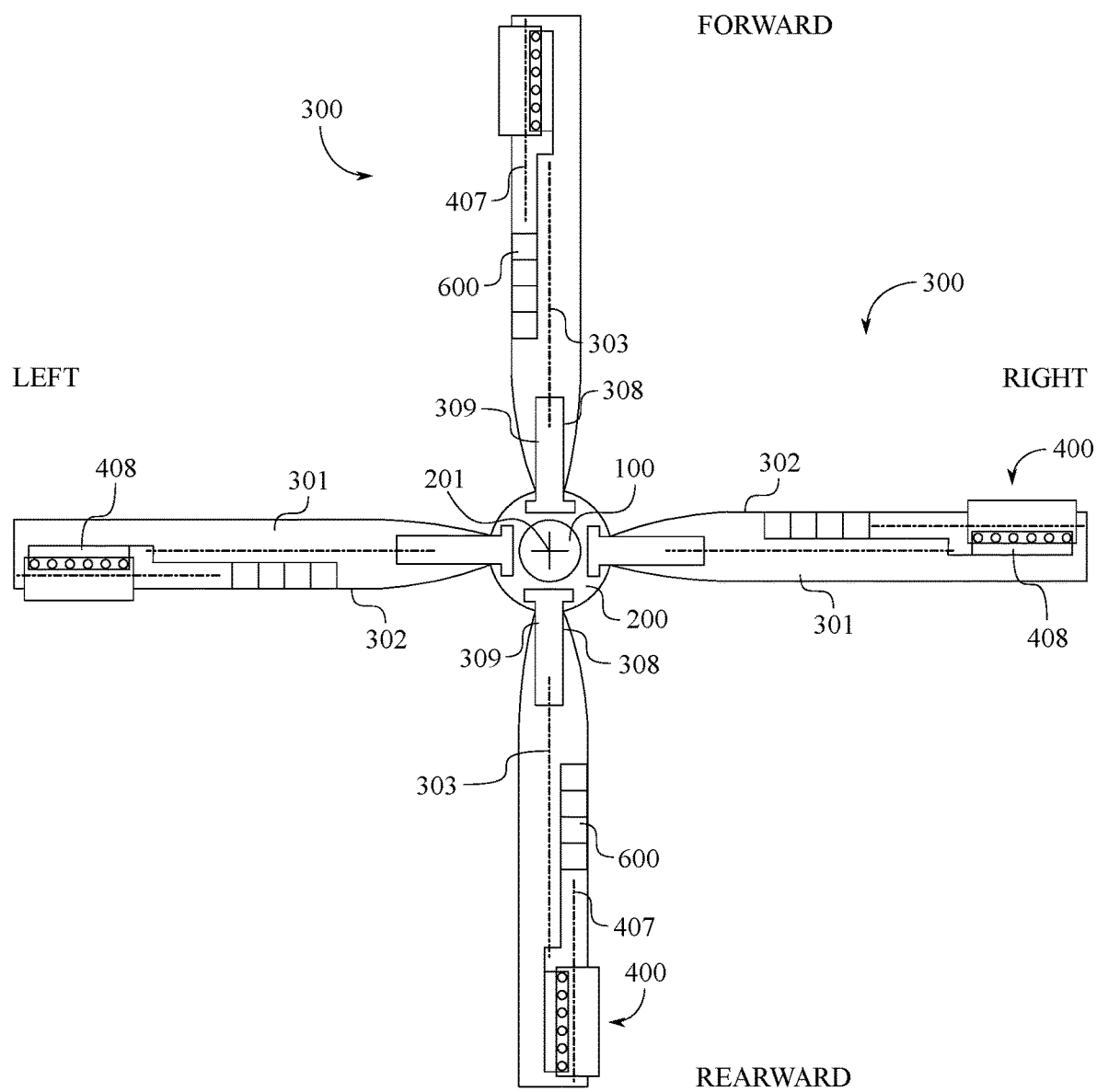
FIG. 9 is a schematic view of the plurality of propelling units being radially distributed around the rotor and the stator.

As the plurality of propelling units 300 travels around the central rotation axis 201, each of the plurality of propelling units 300 pass through four quadrants that are fixed in relation to the orientation of the stator 100. As can be seen in FIG. 9, the stator 100 is fixed in relation to the pilot of the aircraft, thus defining the four quadrants as Left, Right, Forward, and Rearward. Each quadrant is relative to the pilot's orientation and the aircraft's normal direction of travel. When the at least one aileron assembly 400 for each of the plurality of propelling units 300 is actuated in a quadrant, the at least one aileron assembly 400 can raise the corresponding plurality of propelling units 300 in the quadrant. Thus, the aircraft moves away from the quadrant. On the other hand, when the at least one aileron assembly 400 lowers the corresponding plurality of propelling units 300 in the quadrant, the aircraft moves toward the said quadrant. Further, the aileron actuation mechanism 408 actuates the aileron body 401 at the right time, in the right direction, and to the proper degree as the blade body 301 passes through each quadrant to get a controlled result which matches the control input made by the pilot or a flight computer 906. Furthermore, in order to reverse the direction of lift of the plurality of propelling units 300 for the purpose of transitioning from pulling-type propulsion to pushing-type propulsion where required, the direction of the rotor 200 about the central rotation axis 201 is reversed. Also, the blade body 301 for each of the plurality of propelling units 300 rotates around the pitch axis 303 corresponding to each blade body 301 to provide pusher-type propulsion without any loss of efficiency compared to when the plurality of propelling units 300 provided pulling-type propulsion.

To selectively adjust the pitch of the aileron body 401, the aileron actuation mechanism 408 provides electromagnetic methods to control the pitch of the aileron body 401. As can be seen in FIG. 6, the aileron body 401 further comprises an aileron first face 404 and an aileron second face 405. The aileron actuation mechanism 408 comprises an aileron power system 409, a first variable magnet array 410, a second variable magnet array 411, and at least one permanent magnet 412. The at least one permanent magnet 412 traverses through the aileron body 401 from the aileron first face 404 to the aileron second face 405. The at least one permanent magnet 412 is positioned adjacent to the aileron proximal edge 403. Thus, the aileron proximal edge 403 is actuated according to the movement of the at least one permanent magnet 412. The first variable magnet array 410, the second variable magnet array 411, the aileron power system 409, and the blade computing device 306 are all mounted within the blade body 301 to be protected during operation. The first variable magnet array 410 and the second variable magnet array 411 are positioned offset from each other. In addition, the at least one permanent magnet 412 is positioned in between the first variable magnet array 410 and the second variable magnet array 411. Thus, the first variable magnet array 410 and the second variable magnet array 411 can be used to control the position of the at least one permanent magnet 412 in between the first variable magnet array 410 and the second variable magnet array 411. The aileron power system 409 is electrically connected to the first variable magnet array 410 and the second variable magnet. Further, the blade computing device 306 is electronically connected to the aileron power system 409. The aileron power system 409 individually controls the polarity and voltage of the first variable magnet array 410 and the second variable magnet array 411 to attract or repel the at least one permanent magnet 412. Thus, the aileron proximal edge 403 can be raised or lowered to pivot the aileron body 401. The control system 500 is communicably coupled to the blade computing device 306 to remotely control the operation of the aileron actuation mechanism 408. In some embodiments of the present invention, the aileron actuation mechanism 408 can further provide means of recharging the aileron power system 409 without relying on an external power source. As can be seen in FIGS. 9 and 10, the aileron actuation mechanism 408 comprises a plurality of photovoltaic panels 600 integrated into the blade body 301. In addition, the plurality of photovoltaic panels 600 is electrically connected to the aileron power system 409. Thus, the plurality of photovoltaic panels 600 powers the aileron power system 409 to eliminate the need of power sources from the aircraft.

The aileron actuation mechanism 408 provides enough actuating force to control the aileron body 401. In a preferred configuration, the at least one permanent magnet 412 comprises the North (N) magnetic pole outwardly oriented from the aileron first face 404 and the South (S) magnetic pole is outwardly oriented from the aileron second face 405. To position the aileron body 401 in the center position and to keep the aileron body 401 there, the blade computing device 306 instructs the voltage regulator 700 to apply a Direct Current (DC) voltage to the first variable magnet array 410 so the resulting magnetic field is oriented with the N pole facing down thereby repelling the N pole of the at least one permanent magnet 412. At the same time, the blade computing device 306 instructs the voltage regulator 700 to apply a DC voltage to the second variable magnet array 411, so the resulting magnetic field is oriented with the S pole facing up and repelling the S pole of the at least one permanent magnet 412. Thus, the upper and lower opposing magnetic forces hold the at least one permanent magnet 412 at the center position, which consequently holds the aileron body 401 in the center position, as can be seen in FIG. 5. Further, the aileron body 401 exact center position can be calibrated by increasing or decreasing the precise DC voltage applied by the blade computing device 306 to the first variable magnet array 410 and the second variable magnet array 411 for the neutral position. As can be seen in FIG. 7, on the other hand, the vertical position of the at least one permanent magnet 412 in relation to the first variable magnet array 410 and the second variable magnet array 411 can be changed in this case by reducing the voltage of the second variable magnet array 411 while increasing the voltage to the first variable magnet array 410. If greater force is needed to change the AOA of the blade body 301, the blade computing device 306 can instruct the voltage regulator 700 to reverse the polarity of the second variable magnet array 411 from S to N while simultaneously increasing the second variable magnet array's 411 voltage. So, the at least one permanent magnet 412 is now attracted to the N polarity of the second variable magnet array 411 which is oriented upward. Thereby drawing the aileron proximal edge 403 downward which causes the aileron body 401 to pivot upwards into the airflow, consequently moving over the upper surface of the blade body 301 and increasing the AOA of the blade body 301, as can be seen in FIG. 7. Furthermore, the vertical position of the at least one permanent magnet 412 in relation to the first variable magnet array 410 and the second variable magnet array 411 can be changed by reducing the voltage of the first variable magnet array 410 while increasing the voltage to second variable magnet array 411, as can be seen in FIG. 8. If a greater force is needed to change the AOA of the blade body 301, then the blade computing device 306 can instruct the voltage regulator 700 to reverse the polarity of the first variable magnet array 410 from N to S while simultaneously increasing the voltage of the first variable magnet array 410. So, the at least one permanent magnet 412 is now attracted to the S polarity of the first variable magnet array 410 oriented downward, thereby drawing the aileron proximal edge 403 upward. Consequently, the aileron body 401 pivots on the pivot axis 407 downward into the airflow, moving over the lower surface of the blade body 301 and effectively decreasing the AOA of the blade body 301, as can be seen in FIG. 8.

Figure 11:
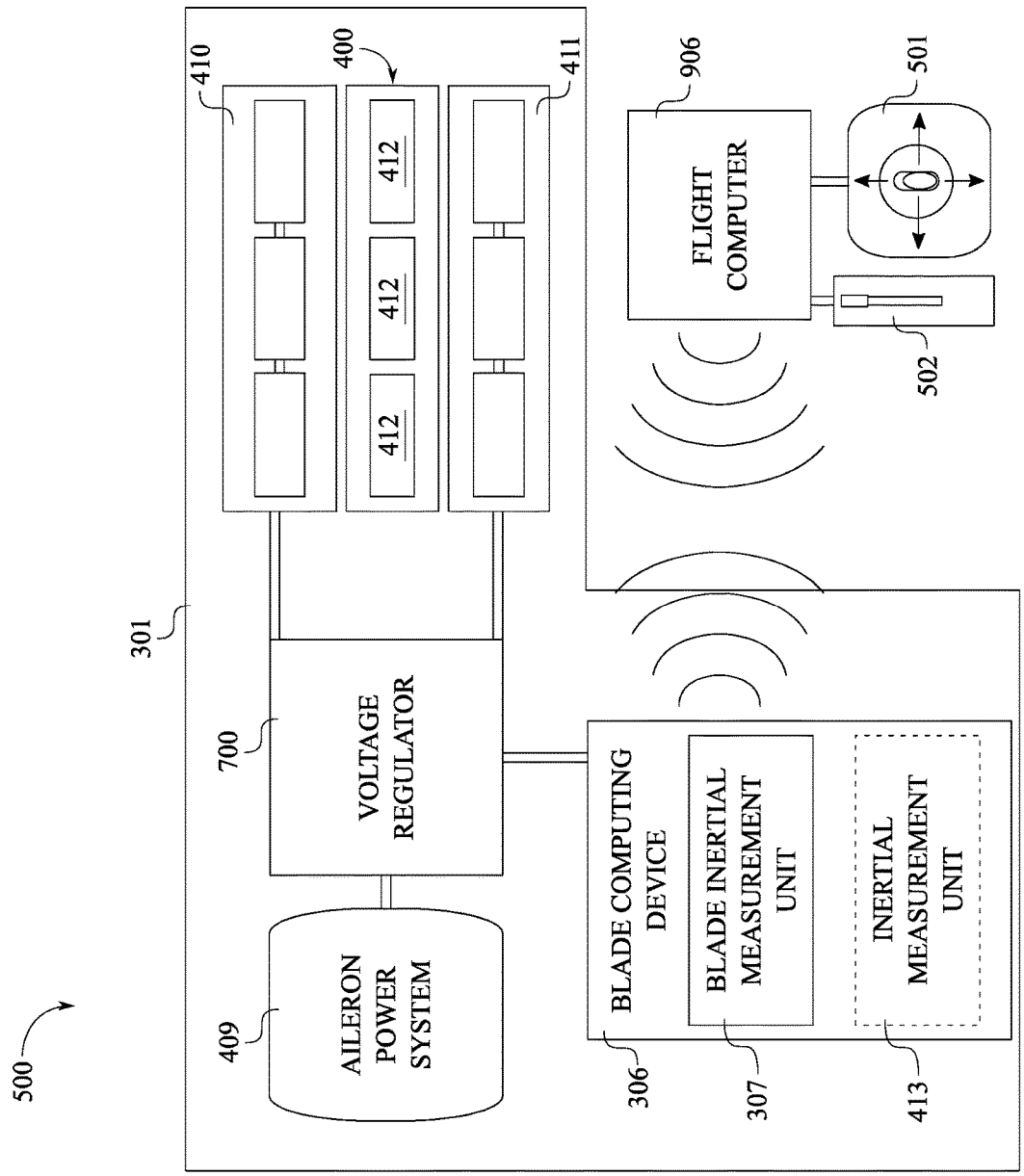
FIG. 11 is a schematic view of the control system, wherein the blade computing device is shown communicably coupled to the control system.

The control system 500 of the present invention provides wirelessly means of communication with the plurality of propelling units 300. As can be seen in FIG. 11, each of the plurality of propelling units 300 comprises a blade computing device 306 and a blade IMU 307. The blade computing device 306 and blade IMU 307 are mounted within the blade body 301. The blade IMU 307 is electronically connected to the blade computing device 306. The blade computing device 306 is communicably coupled to the control system 500, the first variable magnet array 410, and the second variable magnet array 411. Thus, a plurality of control commands is wirelessly transmitted from the flight computer 906 on the aircraft to the aileron actuation mechanism 408 for each of the plurality of propelling units 300 through the blade computing device 306. In addition, a plurality of data comprising pitch and position data is wirelessly transmitted from the blade computing device 306 to the flight computer 906. Pitch and position data are calculated by utilizing a plurality of gyroscopes and a plurality of accelerometers provided in the at least one aileron assembly 400 and/or the blade computing device 306. In some embodiments of the present invention, the present invention provides remote manual means to control the at least one aileron assembly 400. As can be seen in FIG. 11, a joystick 501 and a collective pitch actuating lever 502 are provided to remotely control each of the plurality of propelling units 300 from the cabin of an aircraft. The joystick 501 and the collective pitch actuating lever 502 are electronically connected to the control system 500 to remotely control the operation of the plurality of propelling units 300.

The blade computing device 306 further tracks the position and orientation of the blade body 301. As can be seen in FIG. 11, the blade computing device 306 comprises a blade Inertial Measurement Unit (IMU) 307 that includes three separate axis gyroscopes and three separate axis accelerometers. The blade computing device 306 utilizes the horizontal axis gyroscope to track the rotation of the blade body 301 around the Z-axis which also corresponds to the central rotation axis 201. The positional data is wirelessly transmitted to the flight computer 906 which uses the positional data received from each of the IMUs 413 on the plurality of propelling units 300 to accurately determine where each of the plurality of propelling units 300 is positioned at any given time as each of the plurality of propelling units 300 travels around the stator 100. The flight computer 906 utilizes the positional data to time the actuation of the at least one aileron assembly 400 for each of the plurality of propelling units 300. When control commands are made by a pilot using the joystick 501 and the collective pitch actuating lever 502, these commands are processed by the flight computer 906 which then transmits specific control commands wirelessly to the corresponding at least one aileron assembly 400. The received control commands are converted by the blade computing device 306 into positive or negative direct current voltage (+VDC or −VDC) adjustments which are relayed through the voltage regulator 700 to the first variable magnet array 410 and the second variable magnet array 411. More specifically, the flight computer utilizes the positional data to accurately plot the position of each plurality of propelling units 300 in relation to the rotor 200 including the yaw, pitch, and roll axis of each blade body 301 of the plurality of propelling units 300. So, the control system 500 actuates the appropriate at least one aileron assembly 400 for the required time, duration, and intensity to provide a safe and corresponding response to the inputs received from the joystick 501.

In further embodiments the present invention comprises external features which increase the aerodynamic characteristics of the present invention. As can be seen in FIG. 10, a spinner 800 is mounted onto the rotor 200, opposite the firewall of the aircraft. The spinner 800 is preferably made of lightweight, strong composite material to provide an aerodynamic shape of the present invention. In addition, a plurality of electric motor windings 900 and a plurality of motor magnets 901 are provided to enable electric power from the motor power system 902 of the aircraft to be used as a primary or secondary power source for the plurality of propelling units 300. The plurality of electric motor windings 900 is integrated into the stator 100 and the plurality of motor magnets 901 is integrated into the rotor 200. Thus, the plurality of electric motor windings 900 and the plurality of motor magnets 901 do not obstruct with the operation of the rotor 200 and the stator 100. Furthermore, the plurality of electric motor windings 900 and the plurality of motor magnets 901 may be configured electrically in order to use the windmilling action induced on the present invention in certain modes of operation in order to generate electricity which may then be fed back to the motor power system 902 or alternatively as the primary function when the present invention is used as a wind power generation device.

Supplementary Description:

In alternate embodiments of the present invention, different mechanisms are used to control the plurality of propelling units. A first alternate embodiment comprises a mechanical swash plate assembly 15 to control the rotational timing used to actuate a hydraulic system which in turn actuates the control surfaces 6 on the propelling units 10. A second alternate embodiment utilizes electronic position sensors and a flight computer to control the timing of linear actuators which actuate hydraulic cylinders in a closed loop.

The hydraulic cylinders in turn actuate the control surfaces 6 on each of the flying rotor blades 1 to adjust collective and cyclic pitch as required.

Figure 12:
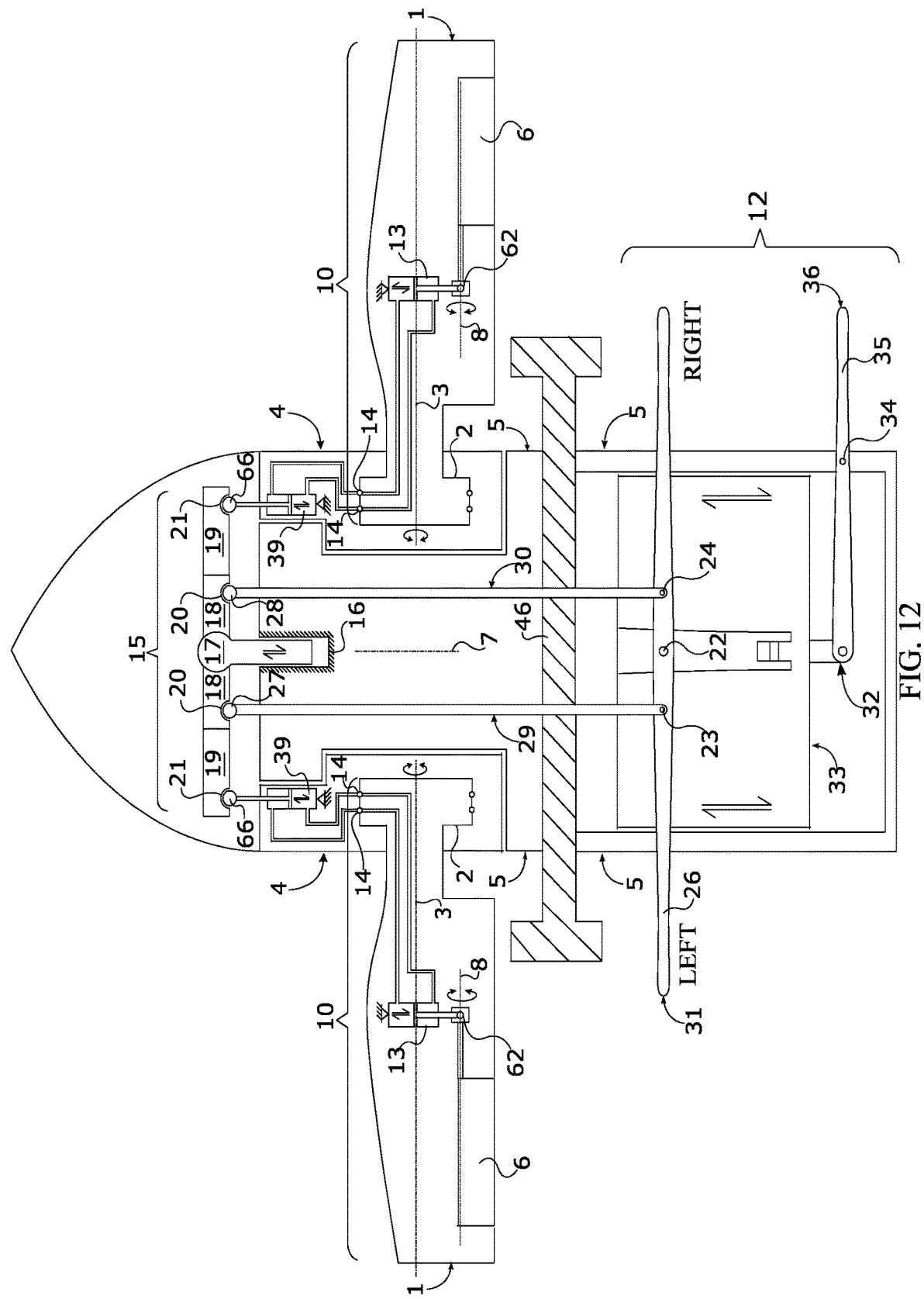
FIG. 12 is a schematic view of the first alternate embodiment of the present invention, wherein the present invention comprises a swashplate assembly and left/right directional controls to control the pitch of the plurality of propelling units.
Figure 13:
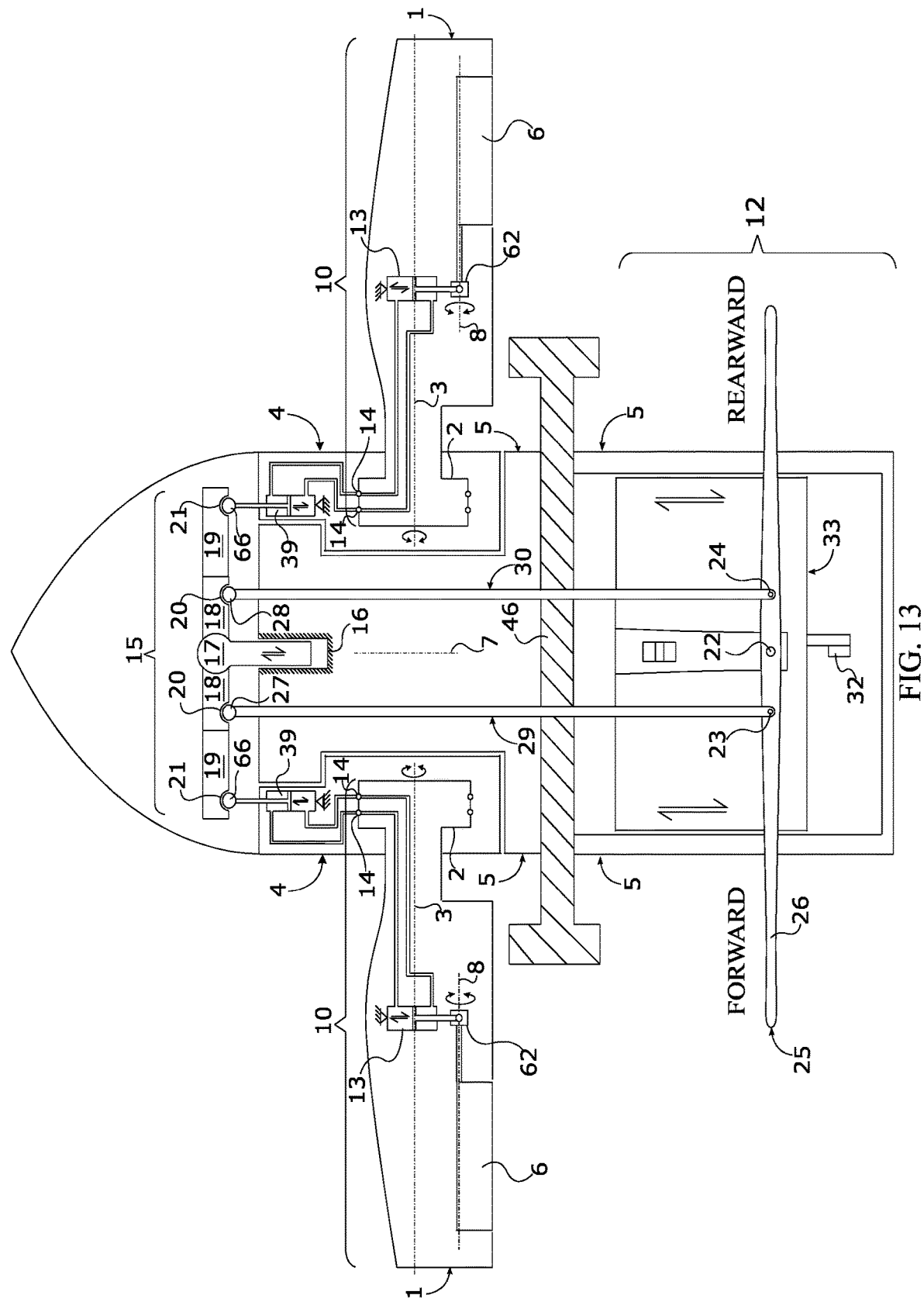
FIG. 13 is a schematic view of the first alternate embodiment of the present invention, wherein the present invention further comprises forward/rearward directional controls to control the pitch of the plurality of propelling units.

As can be seen in FIGS. 12 and 13, in the first alternate embodiment, the present invention is integrated into the firewall 46 of an aircraft with VTOL capabilities and comprises a swash-plate assembly 15 and a rotor control mechanism 12. The rotor control mechanism 12 is operatively coupled to the control surface 6 for each of the plurality of propelling units 10 through the swash-plate assembly 15. The rotor control mechanism 12 is used to adjust the collective pitch of the plurality of propelling units 10 so that the control surface 6 can adjust the pitch of each of the plurality of propelling units 10 in unison. In addition, the rotor control mechanism 12 also adjusts the cyclic pitch of the plurality of propelling units 10, so that the control surface 6 on the flying rotor blade 1 enables each propelling unit 10 to adjust its own pitch independently. The swash-plate assembly 15 receives collective pitch adjustments or cyclic pitch adjustments from the rotor control mechanism 12 and sends either of those pitch adjustments to the control surface 6 on the flying rotor blade 1 for each of the plurality of propelling units 10. The swash-plate assembly 15 comprises a plate base 16, a ball-and-socket joint 17, an inner swash-disc 18, an outer swash-ring 19, a plurality of input sockets 20, and a plurality of output sockets 21. The plate base 16 allows the other components of the swash-plate assembly 15 to be securely mounted within the stator 5.

Furthermore, the plate base 16 is slidably mounted within the stator 5 and both the plate base 16 and the ball-and-socket joint 17 are positioned along the central rotation axis 7 of the rotor 4, which allows the entire swash-plate assembly 15 to move along the central rotation axis 7 of the rotor 4. As can be seen in FIGS. 12 and 13, the plate base 16 is pivotably and centrally mounted to the inner swash-disc 18 by the ball-and-socket joint 17, which provides the inner swash-disc 18 with two rotational degrees of freedom. The outer swash-ring 19 is rotatably mounted onto the inner swash-disc 18 so that the outer swash-ring 19 rotates with the rotor 4 while the inner swash-disc 18 remains fixed to the stator 5. The plurality of input sockets 20 receives the actuation commands from the rotor control mechanism 12 and is peripherally integrated into the inner swash-disc 18. The plurality of output sockets 21 is used to transmit those actuation commands to the input hydraulic cylinder 39 for each propelling unit 10, whereby each input hydraulic cylinder 39 is in fluid communication with its own output hydraulic cylinder 13 in a closed loop. Thus, each input hydraulic cylinder relays the actuation commands hydraulically through the rotor 4, through two sets of annular grooves 14, through the flying rotor blade 1, through the output hydraulic cylinder 13 to the control horn 62 which actuates the control surface 6 along its pivot axis 8 for any of the plurality of propelling units 10 peripherally integrated into the outer swash-ring 19.

As can be seen in FIGS. 12 and 13, the radial separation between the plurality of input sockets 20 and the plurality of output sockets 21 about the central rotation axis 7 of the rotor 4 reduces the mechanical clutter between the rotor control mechanism 12, the swash-plate assembly 15, and the plurality of propelling units 10. The actuation commands received by the plurality of input sockets 20 is generated by the rotor control mechanism 12, which comprises a control frame 33, a collective Pitch Adjustment (PA) lever 35, a left-to-right cyclic PA mechanism 31, and a forward-to-rearward cyclic PA mechanism 25. The control frame 33 allows the other components of the rotor control mechanism 12 to be securely mounted within the stator 5. More specifically, the control frame 33 is slidably mounted within the stator 5 so that the control frame 33 moves in unison with the swash-plate assembly 15. The collective PA lever 35 is used to linearly actuate the control frame 33, which sends actuation commands to the swash-plate assembly 15 to adjust the collective pitch of the plurality of propelling units 10 by actuating control surfaces 6 on all the propelling units 10 collectively. More specifically, a fulcrum 34 of the collective PA lever 35 is hingedly connected to the stator 5, which allows an actuation end 35 of the collective PA lever 35 to be positioned external to the stator 5 and allows a linkage end 32 of the collective PA lever 35 to be coupled adjacent to the control frame 33. Thus, if the actuation end 36 of the collective PA lever 35 is pushed or pulled on the present invention, then the linkage end 32 of the collective PA lever 35 will pull or push the control frame 33.

As can be seen in FIGS. 12 and 13, the left-to-right cyclic PA mechanism 31 and the forward-to-rearward cyclic PA mechanism 25 are used to adjust the cyclic pitch of the flying rotor blade 1 for each of the plurality of propelling units 10 and also provide the mechanical connection between the collective PA lever 35 and the swash-plate assembly 15. The left-to-right cyclic PA mechanism 31 and the forward-to-rearward cyclic PA mechanism 25 each comprise a control lever 26, a first mechanical linkage 29, and a second mechanical linkage 30. The control lever 26 is used to linearly actuate its respective cyclic PA mechanism. The control lever 26 of the left-to-right cyclic PA mechanism 31 and the control lever 26 of the forward-to-rearward cyclic PA mechanism 25 are positioned perpendicular to each other, which allows the left-to-right cyclic PA mechanism 31 and the forward-to-rearward cyclic PA mechanism 25 to linearly actuate any radial portion of the swash-plate assembly 15. A fulcrum 22 of the control lever 26 is hingedly mounted within the control frame 33 so the control lever 26 linearly actuates in one of two opposing directions depending on which side of the fulcrum 22 the control lever 26 is being pulled or pushed by the present invention. The first mechanical linkage 29 and the second mechanical linkage 30 are used to respectively transfer the linear actuation of the control lever 26 from one of the two opposing directions to the swash-plate assembly 15. Thus, an actuation end 23 of the first mechanical linkage 29 is hingedly connected to the control lever 26, and an actuation end 24 of the second mechanical linkage 30 is hingedly connected to the control lever 26. The fulcrum 22 of the control lever 26 is positioned in between the actuation end 23 of the first mechanical linkage 29 and the actuation end 24 of the second mechanical linkage 30, which allows the control lever 26 to linearly actuate the first mechanical linkage 29 and the second mechanical linkage 30 in opposite directions. In addition, a ball insert 27 of the first mechanical linkage 29 and a ball insert 28 of the second mechanical linkage 30 are pivotably engaged to a corresponding pair of opposing input sockets 20 from the swash-plate assembly 15, which completes the transfer of the actuation commands from the rotor control mechanism 12 to the swash-plate assembly 15.

The aforementioned configuration between the swash-plate assembly 15 and the rotor control mechanism 12 allows the present invention to send actuation commands for the adjustment of either the collective pitch or adjusting the cyclic pitch. To adjust the collective pitch when the collective PA lever 35 is actuated, the control frame 33 either simultaneously pulls or simultaneously pushes the first mechanical linkage 29 as well as the second mechanical linkage 30 for both the left-to-right cyclic PA mechanism 31 and the forward-to-rearward cyclic PA mechanism 25 to actuate the swash-plate assembly 15 about the entire perimeter of the inner swash-disc 18. To adjust the cyclic pitch when the control lever 26 of the left-to-right cyclic PA mechanism 31 or the control lever 26 of the forward-to-rearward cyclic PA mechanism 25 is actuated, the first mechanical linkage 29 and the second mechanical linkage 30 of the corresponding cyclic PA mechanism are used to actuate the swash-plate assembly 15 at diametrically-opposing perimeter sections of the inner swash-disc 18.

As can be seen in FIGS. 12 and 13, to relay the actuation commands from the swash-plate assembly 15 to the control surface 6 for each of the plurality of propelling units 10, each of the plurality of propelling units 10 further comprise two sets of annular grooves 14, an input hydraulic cylinder 39, an output hydraulic cylinder 13, a control horn 62, and a ball insert 66. The ball insert 66 is used as a pivotable attachment point which allows the swash-plate assembly 15 to actuate the input hydraulic cylinder 39. Thus, the ball insert 66 is pivotably engaged to a corresponding output socket 21 from the swash-plate assembly 15. In addition, the ball insert 66 is connected adjacent to the input hydraulic cylinder 39. The annular grooves 14 are positioned around the flying rotor blade 1, adjacent to the rotor 4, and are aligned axially around the blade pitch axis 3 of the flying rotor blade 1. The input hydraulic cylinder 39 is used to move hydraulic fluid through two sets of annular grooves 14 to actuate the output hydraulic cylinder 13, which then actuates a control horn 62 that is mounted to the control surface 6, thereby moving the control surface 6 about its control surface pitch axis 8 and then causing the flying rotor blade 1 to move about its blade pitch axis 3, changing its angle of attack into the oncoming airflow. More specifically, both the input hydraulic cylinder 39 and the output hydraulic cylinder 13 are of a standard dual-acting type, whereby there is a fluid chamber with a fluid connector on both sides of the piston so that each chamber of the input hydraulic cylinder 39 is in fluid communication with a corresponding chamber in the output hydraulic cylinder 13. Thus, the input hydraulic cylinder 39 precisely controls the linear motion of the output hydraulic cylinder 13. Further, two sets of annular grooves 14 per propelling unit 10 are in fluid communication with both the input hydraulic cylinder 39 and the output hydraulic cylinder 13 so the hydraulic fluid travels through the rotor 4. The two sets of annular grooves 14 allow the safe exchange of hydraulic fluid between the rotor 4 and the flying rotor blade 1 as the flying rotor blade 1 rotates about its pitch axis 3. Therefore, the two sets of annular grooves are integrated between the rotor 4 and the flying rotor blade 1 and are positioned around the pitch axis of the flying rotor blade 1. The configuration of the two sets of annular grooves prevents mechanical hindrance between the flying rotor blade 1 and the rotor 4, thereby allowing the two sets of annular grooves 14 to transfer the hydraulic fluid that is set in motion by the plurality of output sockets 21 on the swash plate assembly 15 between the input hydraulic cylinder and the output hydraulic cylinder 13.

Figure 14:
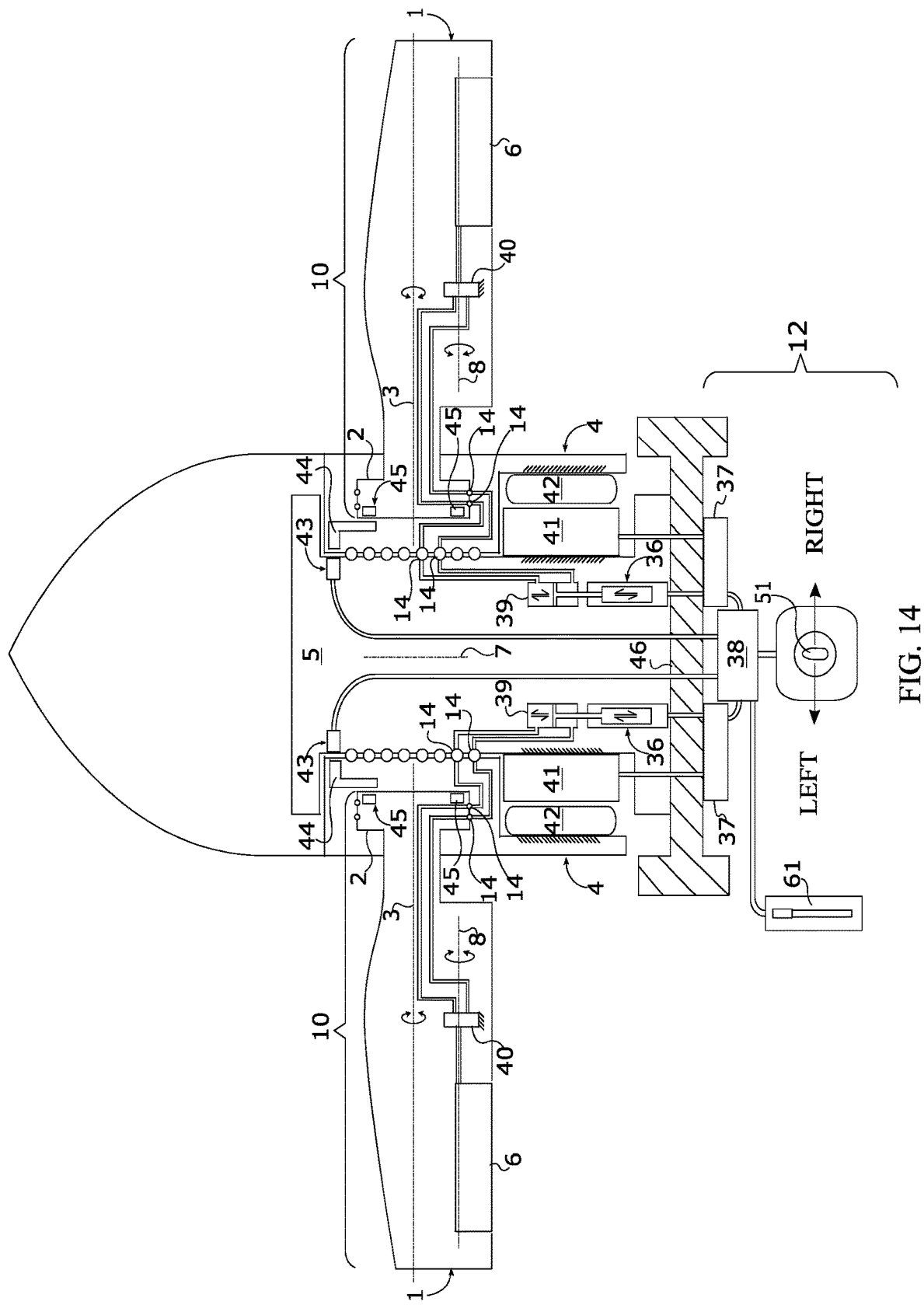
FIG. 14 is a schematic view of the second alternate embodiment of the present invention, wherein the present invention is configured with an electronically timed linear actuation system for left/right directional control and each of the plurality of propelling units comprises a dedicated linear actuator to move hydraulic fluid in two directions in a closed loop travelling through the stator, through the rotor, to hydraulic actuators for the at least one aileron assembly, and wherein further, a plurality of position sensors, senders and relays for the rotor and the plurality of propelling units as well as an electric drive motor incorporated into the stator and rotor are shown.

As can be seen in FIGS. 14 and 15, in the second alternate configuration, the present invention omits the swash plate mechanism replaces the swash plate mechanism with an electronically controlled actuation system. In the second alternate configuration the present invention comprises an electronic joystick 51, a flight computer 38, a plurality of electronic rotor position sensors 43, one electronic rotary wing position relay 44 for each propelling unit 10, and a plurality of electronic rotary wing position sending units 45 for each flying rotor blade 1. Each of the plurality of electronic rotary wing position sending units 45 communicate the pitch of the flying rotor blade 1 when the position sending unit 45 that represents a specific pitch is positioned adjacent to the electronic rotary wing position relay 44. The rotary wing position relay 44 then relays the current pitch of the corresponding propelling unit 10 to each rotor position sensor 43 in turn as the relay travels around the rotational axis 7 of the rotor 4. The flight computer 38 uses the real-time position information received from the plurality of rotor position sensors 43 to accurately control the timing for the actuation of the control surface 6 on each individual propelling unit 10 as the propelling unit rotates through the Left, Right, Forward and Rearward quadrants. Each of the plurality of electronic rotor position sensors 43 are mounted adjacent to each other and are placed radially at equidistant locations around the stator 5. Each electronic rotor position sensor 43 occupies a unique address in the flight computer 38 so the flight computer 38 knows the physical location of each rotor position sensor 43 around the rotor. The plurality of electronic rotary wing position sending units 45 are positioned radially around the mounting surface of the flying rotor blade 1 so each electronic rotary wing position sending unit 45 occupies equidistant adjacent locations relative to each other and each individual rotary wing position sending unit 45 emits a unique value that may be read by the rotary wing position relay 44. The rotary wing position relay then simultaneously relays both the unique value and the corresponding unique ID code to the rotor position sensor 43 which instantly relays the combined information to the flight computer 38. Thus, the flight computer 38 knows each flying rotor blade 1 physical location around the rotational axis 7 of the rotor 4 as well as the pitch of each flying rotor blade 1 at each rotor position sensor 43 location.

As can be seen in FIGS. 14 and 15, in order to relay the actuation commands from the flight computer 38 to the control surface 6 for each of the plurality of propelling units 10, each of the plurality of propelling units 10 further comprise an electric linear actuator 36, an input hydraulic cylinder 39, an electric power supply 37, a plurality of sets of annular grooves 14, and a rotary hydraulic actuator 40. The input hydraulic cylinder 39 and the output rotary hydraulic actuator 40 are both dual-acting and comprise two fluid chambers, one on either side of the piston. Each fluid chamber of the input hydraulic cylinder 39 is in fluid communication with one of the fluid chambers in the output rotary hydraulic actuator 40 so that the motion is hydraulically linked, whereby any motion induced at the input hydraulic cylinder also induces motion at the output rotary hydraulic actuator 40. The closed loop hydraulic configuration therefore requires two sets of annular grooves 14 per flying rotor blade 1. The first two sets of annular grooves 14 are integrated in between the rotor 4 and the stator 5 and need to be positioned around the central rotation axis 7 of the rotor 4. The configuration of the first two sets of annular grooves 14 prevents mechanical hindrance between the rotor 4 and the stator 5. The second two sets of annular grooves 14 are integrated in between the flying rotor blade 1 and the rotor 4 and are positioned around the blade pitch axis 3 of the flying rotor blade 1 where the flying rotor blade interfaces the mating surfaces of the rotational joint 2. The configuration of the second sets of annular grooves 14 prevents mechanical hindrance between the flying rotor blade 1 and the rotor 4. The number of sets of annular grooves 14 integrated in between the rotor 4 and the stator 5 match the number of propelling units 10.

As can be seen in FIGS. 14 and 15, each of the propelling units 10 comprise components which function in a closed loop including an electric linear actuator 36, an input hydraulic cylinder 39, two sets of annular grooves 14 to transfer fluid between the stator 5 and the rotor 4, two sets of annular grooves 14 to transfer fluid between the rotor 4 and the flying rotor blade 1, and an output rotary hydraulic actuator 40. The hydraulic fluid set in motion by the electric linear actuator 36 by pushing or pulling on the input hydraulic cylinder 39 actuates the output rotary hydraulic actuator 40. The output rotary hydraulic actuator then pivots the control surface 6 along the control surface pitch axis 8, thereby actively rotating the flying rotor blade 1 along the blade pitch axis 3.

As can be seen in FIGS. 14 and 15, in the second alternate embodiment, the primary control of the present invention is accomplished by the flight computer 38 which translates positional information received from built-in multi-axis gyroscopes and multi-axis accelerometers to keep the present invention stable as well as to balance the primary function with control requests from the pilot operating the electronic joystick 51. The pilot control requests are input to the electronic joystick 51 by moving the electronic joystick towards any of the four quadrants. The pilot control requests are then processed by the flight computer which actuates one or more of the linear actuators 36 to safely carry out the control request by actuating the control surfaces 6 on any of the propelling units 10 as required. For example, when the aircraft is in a hover state not moving in any direction, if the pilot moves the electronic joystick toward the forward quadrant, the computer is able to accurately time the actuation of the control surfaces 6 on all the propelling units 10. So, when the plurality of propelling units 10 enters the start of the forward quadrant, the corresponding control surfaces 6 are actuated to deflect downward into the airflow moving over the bottom surface of the flying rotor blade 1 and rotating the flying rotor blade 1 on the blade pitch axis 3, giving the flying rotor blade a temporary negative angle of attack; thereby, putting negative or downward pressure on the spar shaft 53 or rotational joint 2 in the Forward quadrant and simultaneously actuating the plurality of propelling units 10. When the plurality of propelling units enter the start of the Rearward quadrant, the corresponding control surfaces 6 are actuated to deflect upward into the airflow, moving over the top surface of the flying rotor blade 1 and rotating the flying rotor blade 1 on the blade pitch axis 3 to generate a positive angle of attack; thereby putting positive or upward pressure on the spar shaft 53 or rotational joint 2 in the Rearward quadrant so the combined effect on the opposing spar shafts 53 or rotational joints 2 acting on the rotor cause the stator and consequently the aircraft to pitch toward the forward quadrant. In addition, when the propelling unit 10 being actuated reaches the center of the respective quadrant, the flight computer reverses the actuation direction so the flying rotor blade 1 is able to return to the neutral angle of attack into the oncoming airflow and is neutral as the flying rotor blade passes into the Left and Right quadrants, causing the aircraft to rotate toward the forward quadrant and changing the angle of thrust toward the Rearward quadrant. Thus, the aircraft is propelled toward the Forward quadrant which corresponds to the direction input from the electronic joystick 51 by the pilot. The rotational speed of the propelling units 10 is controlled by an electric motor incorporated between the rotor 4 and the stator 5, so the present invention further comprises a plurality of motor permanent magnets 42 and a plurality of electric motor windings 41. The electric motor is used to increase, decrease, or maintain the rotor speed to control altitude as the aircraft moves forward. Control inputs in the direction of all quadrants function in the same way as described for the Forward quadrant.

Although the invention has been explained in relation to its preferred embodiment, it is to be understood that many other possible modifications and variations can be made without departing from the spirit and scope of the invention as hereinafter claimed.

What is claimed is:

1. A propelling system with variable aerodynamic controls comprises:
   a stator;
   a rotor;
   a plurality of propelling units;
   a control system;
   each of the plurality of propelling units comprising a blade body, a shaft channel, a spar shaft, at least one aileron assembly, a blade computing device, and a blade inertial measurement unit (IMU);
   the blade body comprising a trailing edge;
   the rotor being rotatably mounted to the stator;
   the plurality of propelling units being radially positioned around a central rotation axis of the rotor;
   the rotor being terminally connected to the spar shaft for each of the plurality of propelling units;
   the spar shaft for each of the plurality of propelling units being positioned perpendicular to the central rotation axis of the rotor;
   the shaft channel traversing into the blade body;
   the shaft channel being positioned perpendicular to the central rotation axis of the rotor;
   the spar shaft being positioned within the shaft channel;
   the blade body being rotatably mounted about the spar shaft;
   the at least one aileron assembly being operatively integrated into the blade body, adjacent to the trailing edge, wherein the at least one aileron assembly is used to adjust the pitch of the blade body;
   the control system being electronically connected to the at least one aileron assembly;
   the blade computing device and the blade IMU being mounted within the blade body;
   the blade IMU being electronically connected to the blade computing device; and,
   the blade computing device being communicably coupled to the control system.

2. The propelling system with variable aerodynamic controls as claimed in claim 1 further comprises:
   a pitch axis of the blade body being positioned coincident to a center of lift of the blade body;
   the pitch axis of the blade body being positioned coincident to a center of gravity of the blade body; and,
   the shaft channel being axially positioned along the pitch axis of the blade body.

3. The propelling system with variable aerodynamic controls as claimed in claim 1 further comprises:
   a pitch axis of the blade body being positioned adjacent to a center of lift of the blade body;
   the pitch axis of the blade body being positioned adjacent to a center of gravity of the blade body; and,
   the shaft channel being axially positioned along the pitch axis of the blade body.

4. The propelling system with variable aerodynamic controls as claimed in claim 1, wherein the blade body is a flying wing airfoil.

5. The propelling system with variable aerodynamic controls as claimed in claim 1 further comprises:

the at least one aileron assembly comprising an aileron body, an aileron fulcrum, and an aileron actuation mechanism;

the aileron body comprising an aileron proximal edge and an aileron distal edge;

the aileron body traversing into the blade body from the trailing edge;

the aileron body being hingedly mounted to the blade body by the aileron fulcrum;

a pivot axis of the aileron fulcrum being positioned parallel to the trailing edge;

the aileron fulcrum being positioned in between the aileron proximal edge and the aileron distal edge;

the aileron proximal edge being positioned within the blade body;

the aileron actuation mechanism being operatively coupled to the aileron proximal edge, wherein the aileron actuation mechanism is used to change a pitch of the aileron body; and, the aileron actuation mechanism being communicably coupled to the control system.

6. The propelling system with variable aerodynamic controls as claimed in claim 5 further comprises:

the at least one aileron assembly further comprising an aileron inertial measurement unit (IMU); and, the aileron IMU being communicably coupled to the control system.

7. The propelling system with variable aerodynamic controls as claimed in claim 5 further comprises:

the aileron body further comprising an aileron first face and an aileron second face;

the aileron actuation mechanism comprising an aileron power system, a first variable magnet array, a second variable magnet array, and at least one permanent magnet;

the at least one permanent magnet traversing through the aileron body from the aileron first face to the aileron second face;

the at least one permanent magnet being positioned adjacent to the aileron proximal edge;

the first variable magnet array, the second variable magnet array, the aileron power system, and the blade computing device being mounted within the blade body;

the first variable magnet array and the second variable magnet array being positioned offset from each other;

the at least one permanent magnet being positioned in between the first variable magnet array and the second variable magnet array;

the aileron power system being electrically connected to the first variable magnet array and the second variable magnet;

the blade computing device being electronically connected to the aileron power system; and, the control system being communicably coupled to the blade computing device.

8. The propelling system with variable aerodynamic controls as claimed in claim 7 further comprises:

a plurality of photovoltaic panels;

the plurality of photovoltaic panels being integrated into the blade body; and, the plurality of photovoltaic panels being electrically connected to the aileron power system.

9. The propelling system with variable aerodynamic controls as claimed in claim 1 further comprises:

a joystick;

a collective pitch actuating lever; and, the joystick and the collective pitch actuating lever being electronically connected to the control system.

10. A propelling system with variable aerodynamic controls comprises:

a stator;

a rotor;

a plurality of propelling units;

a control system;

each of the plurality of propelling units comprising a blade body, a shaft channel, a spar shaft, at least one aileron assembly, and a blade computing device;

the blade body comprising a trailing edge;

the at least one aileron assembly comprising an aileron body, an aileron fulcrum, and an aileron actuation mechanism;

the aileron body comprising an aileron proximal edge, an aileron distal edge, an aileron first face, and an aileron second face;

the aileron actuation mechanism comprising an aileron power system, a first variable magnet array, a second variable magnet array, and at least one permanent magnet;

the rotor being rotatably mounted to the stator;

the plurality of propelling units being radially positioned around a central rotation axis of the rotor;

the rotor being terminally connected to the spar shaft for each of the plurality of propelling units;

the spar shaft for each of the plurality of propelling units being positioned perpendicular to the central rotation axis of the rotor;

the shaft channel traversing into the blade body;

the shaft channel being positioned perpendicular to the central rotation axis of the rotor;

the spar shaft being positioned within the shaft channel;

the blade body being rotatably mounted about the spar shaft;

the at least one aileron assembly being operatively integrated into the blade body, adjacent to the trailing edge, wherein the at least one aileron assembly is used to adjust the pitch of the blade body;

the control system being electronically connected to the at least one aileron assembly;

the aileron body traversing into the blade body from the trailing edge;

the aileron body being hingedly mounted to the blade body by the aileron fulcrum;

a pivot axis of the aileron fulcrum being positioned parallel to the trailing edge;

the aileron fulcrum being positioned in between the aileron proximal edge and the aileron distal edge;

the aileron proximal edge being positioned within the blade body;

the aileron actuation mechanism being operatively coupled to the aileron proximal edge, wherein the aileron actuation mechanism is used to change a pitch of the aileron body;

the aileron actuation mechanism being communicably coupled to the control system;

the at least one permanent magnet traversing through the aileron body from the aileron first face to the aileron second face;

the at least one permanent magnet being positioned adjacent to the aileron proximal edge;

the first variable magnet array, the second variable magnet array, the aileron power system, and the blade computing device being mounted within the blade body;

the first variable magnet array and the second variable magnet array being positioned offset from each other;

the at least one permanent magnet being positioned in between the first variable magnet array and the second variable magnet array;

the aileron power system being electrically connected to the first variable magnet array and the second variable magnet;

the blade computing device being electronically connected to the aileron power system; and, the control system being communicably coupled to the blade computing device.

11. The propelling system with variable aerodynamic controls as claimed in claim 10 further comprises:

a pitch axis of the blade body being positioned coincident to a center of lift of the blade body;

the pitch axis of the blade body being positioned coincident to a center of gravity of the blade body; and, the shaft channel being axially positioned along the pitch axis of the blade body.

12. The propelling system with variable aerodynamic controls as claimed in claim 10 further comprises:

a pitch axis of the blade body being positioned adjacent to a center of lift of the blade body;

the pitch axis of the blade body being positioned adjacent to a center of gravity of the blade body; and, the shaft channel being axially positioned along the pitch axis of the blade body.

13. The propelling system with variable aerodynamic controls as claimed in claim 10 further comprises:

the at least one aileron assembly further comprising an aileron Inertial Measurement Unit (IMU); and, the aileron IMU being communicably coupled to the control system.

14. The propelling system with variable aerodynamic controls as claimed in claim 10, wherein the blade body is a flying wing airfoil.

15. The propelling system with variable aerodynamic controls as claimed in claim 10 further comprises:

a plurality of photovoltaic panels;

the plurality of photovoltaic panels being integrated into the blade body; and, the plurality of photovoltaic panels being electrically connected to the aileron power system.

16. The propelling system with variable aerodynamic controls as claimed in claim 10 further comprises:

each of the plurality of propelling units further comprising a blade inertial measurement unit (IMU);

the blade computing device and the blade IMU being mounted within the blade body;

the blade IMU being electronically connected to the blade computing device; and, the blade computing device being communicably coupled to the control system.

17. The propelling system with variable aerodynamic controls as claimed in claim 10 further comprises:

a joystick;

a collective pitch actuating lever; and, the joystick and the collective pitch actuating lever being electronically connected to the control system.

\* \* \* \* \*